March 19, 1968
E. M. VILLALON
3,374,055
EXTRACTION OF PHOSPHORIC ACID AND
THE PURIFICATION THEREOF
Filed Sept. 24, 1963
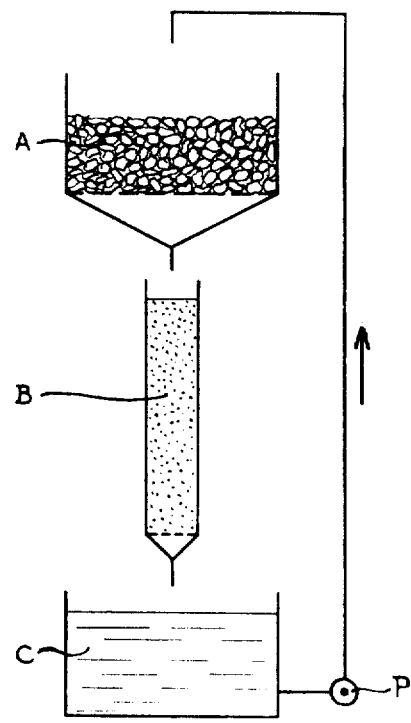
Inventor:
Ernest Michel Villalon
By
Karen W. Flocks 3,374,055
EXTRACTION OF PHOSPHORIC ACID AND
THE PURIFICATION THEREOF
Ernest Michel Villalon, Attichy, Oise, France, assignor to
Compagnie des Gelatines Francaises, Paris, France, a
joint-stock company of France
Filed Sept. 24, 1963, Ser. No. 311,029
Claims priority, application France, Nov. 12, 1962,
915,417; June 4, 1963, 937,585
12 Claims. (Cl. 23—107)

The extraction and commercialization of calcium phosphates, in particular tri-calcium salts and especially of tri-calcium phosphates from bones, presents problems, the solution of which has, up to the present time, encountered very considerable difficulties. The phosphoric compounds obtained by conventional methods are very impure, and the efficiencies of recovery of the phosphorus are poor.

The method of the present invention enables the calcium phosphates, especially tri-calcium phosphates from bones, to be converted with efficiencies in the vicinity of 100% to a phosphoric acid which can be converted in turn, without any accessory purifying operation, to alkaline phosphates of high purity and high commercial value.

The method in accordance with the invention comprises the attack of a tri-calcium phosphate by phosphoric acid, this operation being followed by at least one stage comprising the passage of the aqueous solution resulting from this attack over at least one ion exchange resin.

In accordance with one method of carrying out this process, bones are treated with an aqueous solution of recovered phosphoric acid derived from a previous operation, if necessary, in the presence of a supplementary reserve quantity of phosphoric acid, the treatment being effected in such manner as to transform the tri-calcium phosphate from the bones to soluble mono-calcium phosphate, following the reaction:

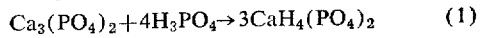

$$Ca_3(PO_4)_2 + 4H_3PO_4 \rightarrow 3CaH_4(PO_4)_2 \quad (1)$$

The ossein of the bones remains in the insoluble state; the aqueous solution of mono-calcium phosphate obtained is percolated over a cation-exchange resin which is regenerated in an H+ cycle, so as to convert the percolated mono-calcium phosphate to phosphoric acid.

In this form of embodiment, the operation of percolation is thus effected in accordance with the overall reaction:

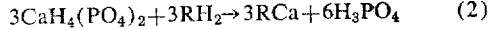

$$3CaH_4(PO_4)_2 + 3RH_2 \rightarrow 3RCa + 6H_3PO_4 \quad (2)$$

After this percolation operation, the phosphoric acid necessary for the treatment of the tri-calcium phosphate ($4H_3PO_4$) in accordance with Reaction 1 is recirculated while the supplementary phosphoric acid derived from the tri-calcium phosphate employed ($2H_3PO_4$) is utilized for the manufacture of a commercial alkali phosphate, for example di-sodium phosphate, by treatment with an alkali such as sodium carbonate, in accordance with the reaction:

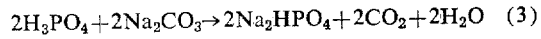

$$2H_3PO_4 + 2Na_2CO_3 \rightarrow 2Na_2HPO_4 + 2CO_2 + 2H_2O \quad (3)$$

The cationic resin saturated with Ca++ ions obtained from the percolation operation is treated with an aqueous solution of a strong mineral acid such as hydrochloric acid to re-generate the initial resin $RH_2$ in accordance with the reaction:

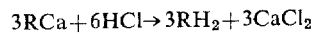

$$3RCa + 6HCl \rightarrow 3RH_2 + 3CaCl_2$$

According to a further form of application of the method of the invention, the tri-calcium phosphate is treated with phosphoric acid in accordance with Reaction 1 and the mono-calcium phosphate obtained is treated with sulphuric acid; the resulting relatively insoluble calcium sulphate is separated and the solution containing the phosphoric acid and some dissolved calcium sulphate is treated by means of at least one ion-exchange resin to remove the remaining calcium sulphate, the phosphoric acid being then recovered.

According to the particular features of this method of carrying out the invention:

The solution containing the phosphoric acid is treated by means of a cation-exchange resin;

The solution containing the decationized (or cation-freed) phosphoric acid can also preferably be treated by treatment of an ion-exchanger resin.

The troublesome $SO_4^{--}$ ions present in the solution containing the phosphoric acid are eventually precipitated by an agent which forms an insoluble sulphate before the treatment with the ion-exchange resin.

The method according to the present invention is applicable to any tri-calcium phosphate or to any soluble mono-calcium phosphate derived from a natural source or resulting from the conversion of a tri-calcium phosphate. The method gives a phosphoric acid of high purity which permits alkali phosphates to be obtained which are also very pure and which may be converted to, for example tri-polyphosphates of high commercial value.

The present invention is particularly useful, especially in the bone treatment industry and in the manufacture of gelatines, glues, etc.

The various phases of the method according to the invention will now be examined in greater detail.

According to the first method of application of the operations of treatment to bones (1) and of the conversion of the mono-calcium phosphate obtained to phosphoric acid (2), these operations are preferably carried out as a continuous process, for example in accordance with the accompanying diagram, in which:

A is a tank containing the bones to be treated;
B is a column charged with a cationic resin;
C is a receiver for phosphoric acid;
P is a circulating pump.

The aqueous solution of phosphoric acid, taken by the pump P, is continuously re-cycled.

The material in A becomes progressively poorer in phosphorous.

The cation resin to be charged into the column B will be of the strong acid type, for example the sulphonated polystyrene kind such as "IMAC C-12" of the IMACTI Company; however, any other type of cationic resin can be utilized, for example:

"Dowex 50" of the Dow Chemical Co.; "Amberlite IR 120" of the Rohm & Hass Company; "Allasion CS" of the Diaprosim Co., etc.

For the re-cycling there will be employed an aqueous solution of recovered phosphoric acid, in which the content of phosphoric acid will preferably be from 80 to 150 grams per litre.

The operation is carried out in the cold state at a temperature not exceeding 20° C.

The acidification is effected in such manner as to ensure the total conversion of the tri-calcium phosphate of the bones to mono-calcium phosphate, and the conversion of the mono-calcium phosphate to phosphoric acid. The time required for these operations varies with the size of the bones employed.

EXAMPLE I 100 kg. of de-greased dry Indian bones of current quality, size 9.5 mm. (3.8 inch) having a content of phosphorus corresponding to 33.2 kg. of $H_3PO_4$ were continuously treated by a solution of recovery phosphoric acid at 150 grams of $H_3PO_4$ per litre. The cationic resin charged into the column B was "IMAC C–12" regenerated in an $H^+$ cycle. The operation was carried out at about 15° C.; the conversion to phosphoric acid was complete at the end of 6½ days.

sodium phosphate, $Na_2HPO_4 \cdot 12H_2O$ and $Na_3PO_4 \cdot 12H_2O$ corresponded to the following analysis:

|  | Di-sodium phosphate $Na_2HPO_4.12H_2O$ (percent) | Tri-sodium phosphate $Na_3PO_4.12H_2O$ (percent) | Results expressed in percent of $P_2O_5$ | |
|---|---|---|---|---|
|  |  |  | Di-sodium | Tri-sodium |
| $P_2O_5$ | 19.9 | 18.55 | 100 | 100 |
| $SO_3$ | 0 | 0 | 0 | 0 |
| F | 0.027 | 0.019 | 0.13 | 0.10 |
| Cl | 0 | 0 | 0 | 0 |
| CaO | 0 | 0 | 0 | 0 |
| MgO | 0 | 0 | 0 | 0 |
| $Fe_2O_3$ | 0.014 | 0.0072 | 0.07 | 0.04 |
| $Al_2O_3$ | 0 | 0 | 0 | 0 |
| P.p.m. $As_2O_3$ | 3.56 | 3.7 | 18 | 20 |
| Theoretical values | 19.9 | 18.68 |  |  |

If these contents of impurities are compared with those of known technical solutions of phosphoric acid prepared by the wet process, the enormous difference can be seen:

| Known technical solutions of phosphoric acid | | Figures expressed in percent of $P_2O_5$ | | | | |
|---|---|---|---|---|---|---|
|  |  | Known technical solutions of phosphoric acid | | Phosphates prepared following the invention | |
| DORR process by decantation (percent) | DORR process by filtration (percent) | DORR process by decantation | DORR process by filtration | Di-sodium | Tri-sodium |
| $P_2O_5$ | 21.4 | 53.5 | 100 | 100 | 100 | 100 |
| $SO_3$ | 0.8 | 2.6 | 3.7 | 4.9 | 0 | 0 |
| F | 2.0 | 0.8 | 9.3 | 1.5 | 0.13 | 0.10 |
| Cl |  |  |  |  | 0 | 0 |
| CaO | 1.0 | 0.3 | 4.7 | 0.6 | 0 | 0 |
| MgO |  |  |  |  | 0 | 0 |
| $Fe_2O_3$ | 0.7 | 1.0 | 3.3 | 1.9 | 0.07 | 0.04 |
| $Al_2O_3$ | 0.7 | 1.0 | 3.3 | 1.9 | 0 | 0 |
| P.p.m. $As_2O_3$ | 30 | 50 | 140 | 93 | 18 | 20 |

At such time, a phosphorus balance was established:

There was introduced into the circuit as a reserve or reagent, 300 litres of phosphoric solution at 150 grams of $H_3PO_4$ per litre, or 45 kg. of $H_3PO_4$. The quantity of phosphoric acid employed was therefore:

|  | Kg. |
|---|---|
| $H_3PO_4$ derived from the reserve attacking agent | 45 |
| $H_3PO_4$ from the bones | 33.2 |
| Total $H_3PO_4$ employed | 78.2 |

At the end of the operation, there were recovered:

|  | Kg. |
|---|---|
| $H_3PO_4$ in the form of a solution at 98 grams of $H_3PO_4$ per litre | 34.9 |
| $H_3PO_4$ in the form of a less-concentrated solution | 42.4 |
| Total $H_3PO_4$ obtained | 77.3 |

These figures show that with the present method, the extraction efficiency of the process with respect to the phosphorus from the bones approaches 100%.

With regard to the conversion to alkali phosphate of the portion of phosphoric acid derived from the tri-calcium phosphate, i.e., 33.2 kg. in the present example, this was found to have been carried out by simple neutralization, without any accessory operation of purification, namely: neutralization by sodium carbonate at a pH value of 8.6, for the conversion to di-sodium phosphate:

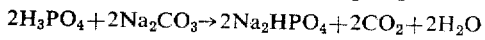

followed by completion of the neutralization with caustic soda, at a pH value of 12, for conversion of a part of the di-sodium phosphate to tri-sodium phosphate:

After evaporation, crystallization and centrifuging, the phosphorus balance of the process of manufacture showed practically no deficit.

The crystals obtained of di-sodium phosphate and tri-

It can be seen from a mere examination of the above table that these conventional technical solutions of phosphoric acid cannot, unlike those of the present invention, be directly converted, by simple neutralization without complicated accessory operations of purification, to alkali phosphates of high purity.

In the conventional methods of purification, the impurities of phosphoric acid ($H_2SiF_6$, $H_3AsO_3$, $H_2SO_4$, $CaSO_4$, $Al(OH)_3$, $Fe(OH)_3$ . . .) are precipitated in a number of successive stages in the form of almost insoluble compounds ($Na_2SiF_6$, $As_2S_3$, $BaSO_4$, $AlPO_4$, $FePO_4$ . . .) but which are not entirely insoluble. On the other hand, it is necessary to employ an excess of reagents ($Na_2S$, $BaCO_3$ . . .) which results in the appearance of small quantities of new impurities. The purification is therefore never complete, and in addition, it involves losses of phosphorus.

Furthermore, in the conventional acidification process of bones using hydrochloric acid, the tri-calcium phosphate is converted to soluble mono-calcium phosphate, which is precipitated with lime to the state of very impure di-calcium phosphate. The efficiency of phosphorus recovery in this form is very poor: in practice it hardly exceeds 85%.

It is clear that the alkali phosphates obtained in accordance with the present method may also serve as raw materials for the manufacture of other phosphates, such as condensed phosphates, for example tri-polyphosphates.

Finally, the present method renders economically possible for the first time the acidification of bones by phosphoric acid, since the phosphoric acid is recovered and recycled.

The ossein which remains as the residue of extraction from bones in the method of the present invention may be treated by the normal conventional process for the purpose of extraction of gelatine, i.e., treating with lime, followed by extraction of the gelatine by hydrolysis of collagen in an aqueous medium, at increasing moderate temperatures, which normally gives gelatine broths of decreasing quality.

With the ossein resulting from the method of the present invention, this treatment gave five gelatine broths, the quality of which was higher than that obtained using ossein resulting from hydrochloric acidification of bones.

The improvement was first applied to the "jelly strength" determined by means of the Bloom gelometer following the method adopted by the National Association of Glue Manufacturers, Atlantic City, N.J., which method consists in measuring the resistance to penetration of a gelatine gel prepared by a standard method, the gelatine gel being subjected to the action of a standardized piston.

In the case of the first two broths, for example, the jelly strengths (expressed at a humidity of 13%) were:

First broth: 328 (as compared with a normal value of about 270);

Second broth: 272 (as compared with a normal value of about 240).

The values indicated parenthetically for comparison are those generally obtained by the method of treating ossein obtained by acidification of bones with hydrochloric acid.

The content of mineral substances in the gelatine obtained by the present method was 0.50 to 0.65%, whereas the gelatine manufactured by the conventional method from ossein from bone treated with hydrochloric acid comprises about 1.5 to 1.8% of mineral substances.

Improvement was also obtained in the colour, especially with regard to the last extractions of gelatine.

Finally, the efficiency obtained was 19 kg. of gelatine from 100 kg. of bones, thus slightly greater than the usual efficiencies (18 to 18.5 kg.). In spite of the slight difference in efficiency in absolute value, this gain of 0.5 to 1% is of great importance economically.

In accordance with a further method of application of the process of the invention, the bones are treated as above, in accordance with reaction 1:

$$Ca_3(PO_4)_2 + 4H_3PO_4 \rightarrow 3CaH_4(PO_4)_2 \quad (1)$$

after which there is percolated over the cation-exchange resin, regenerated in an $H^+$ cycle, only the quantity of solution of mono-calcium phosphate necessary to recover the re-cycled phosphoric acid intended for further treatment of the tri-calcium phosphate:

$$2CaH_4(PO_4)_2 + 2RH_2 \rightarrow 2RCa + 4H_3PO_4 \quad (2a)$$

The remainder of the mono-calcium phosphate is passed over a cation exchanger, regenerated in an $Na^+$ cycle, so as to convert this mono-calcium phosphate to alkali monosodium phosphate:

$$CaH_4(PO_4)_2 + RNa_2 \rightarrow RCa + 2NaH_2PO_4 \quad (3a)$$

The regeneration of the resin saturated with $Ca^{++}$ ions obtained from operation (2a) will be effected by means of a strong mineral acid such as hydrochloric acid according to the equation:

$$2RCa + 4HCl \rightarrow 2CaCl_2 + 2RH_2 \quad (4)$$

while the regeneration of the resin saturated with $Ca^{++}$ ions derived from the operation (3a) will be carried out by means of a solution of sodium chloride following the reaction:

$$RCa + 2NaCl \rightarrow CaCl_2 + RNa_2 \quad (5)$$

Following the other preferred form of application of the invention, the tri-calcium phosphate is converted as previously described by treatment with phosphoric acid to obtain an aqueous solution of mono-calcium phosphate.

The major portion of the $Ca^{++}$ ions is first eliminated by precipitation by means of sulphuric acid, in the form of calcium sulphate, and the mono-calcium phosphate is converted to phosphoric acid according to the equation:

$$Ca(H_2PO_4)_2 + H_2SO_4 \rightarrow CaSO_4 + 2H_3PO_4 \quad (6)$$

The precipitated calcium sulphate is separated out, for example by filtration, and the regenerated impure phosphoric acid is then freed from cations by percolation over ion-exchange resins of the cation type regenerated in an $H^+$ cycle.

The conjoint action of the double decomposition with sulphuric acid and the fixation on cation-exchange resins makes it possible to prepare a regenerated phosphoric acid which is completely free from $Ca^{++}$ ions (and other cations), without it being necessary to employ large quantities of cationic resins.

Furthermore, a simple chemical treatment by sulphuric acid following Reaction 6 above, would not permit the obtention of regenerated phosphoric acid free from $Ca^{++}$ ions. In view of the relatively great solubility of calcium sulphate in a dilute phosphoric medium, it is in fact impossible with this technique to eliminate completely the calcium from the mono-calcium liquor. The table below gives the dosed $Ca^{++}$ and the soluble sulphate corresponding in a filtrate of phosphoric acid, derived for example from a mono-calcium liquor at 28.6 grams per litre of Ca (and 172 grams per litre of phosphoric acid) treated with increasing quantities of $H_2SO_4$, that is to say from 90 to 100% of the quantity theoretically required to eliminate all the calcium.

Thus, with 90% of the theoretical sulphuric acid for example, the content of residual calcium derived from the mono-calcium phosphate is $$\frac{(100-90) \times 2.86}{100} = 2.86 \text{ g./l}$$

The total amount of $Ca^{++}$ dosed in the $H_3PO_4$ filtrate was 4.95 g./l.; the content of soluble calcium sulphate was thus calculated as follows:

$$(4.95 - 2.86) \times \frac{CaSO_4}{Ca} = (4.95 - 2.86) \times \frac{136}{40} = 7.1 \text{ g./l}$$

TABLE 1

| Mono-calcium liquor | | $H_3PO_4$ filtrate | |
|---|---|---|---|
| $H_2SO_4$ (Percent) | Residual Ca (g./l.) | Dosed $Ca^{++}$ (g./l.) | Soluble $CaSO_4$ (g./l.) |
| 90 | 2.86 | 4.95 | 7.1 |
| 95 | 1.43 | 3.65 | 7.55 |
| 97.5 | 0.72 | 3.60 | 9.96 |
| 100 | 0 | 3.44 | 11.7 |
| 102.5 | 0 | 3.22 | 10.95 |
| 105 | 0 | 3.22 | 10.95 |

It can be seen that there remains in the regenerated acid approximately 12% of the initial calcium after the addition of the quantity of $H_2SO_4$ theoretically necessary for its complete elimination. With 100% of $H_2SO_4$, there remains in fact 3.44 g./l. of calcium, namely $$\frac{3.44}{28.6} \times 100 = 12\%$$

The method of the present invention, by combining the two techniques of elimination of the calcium, one by the chemical method of double decomposition and the other by the method of fixation on ion exchangers, enables the problem to be solved in a simple and economical manner.

As an interesting application of the invention, there may be cited by way of illustration that of the gelatine industry. There may preferably also be cited an operation carried out on an aqueous mono-calcium solution obtained by treatment of bones, by means of an aqueous solution of recovered phosphoric acid derived from a previous operation, following the Reaction 1 above, the ossein of the bones remaining in the insoluble condition.

The whole of the aqueous solution of monocalcium phosphate which includes the $H_3PO_4$ acid employed for treatment of the bones and the $H_3PO_4$ corresponding to the tri-calcium phosphate of the bones, is then treated with $H_2SO_4$ as indicated above and in accordance with Reaction 6. However, the $H_2SO_4$ is only added in a proportion of 85 to 90% of the theoretical quantity corresponding to the whole of the calcium, so as to attain the minimum solubility of the $CaSO_4$ in the vicinity of 7 g./l. The two phases, solid and liquid are separated by filtration.

The filtrate then contains regenerated $H_3PO_4$, residual mono-calcium phosphate and soluble sulphate of lime ($CaSO_4$). The $SO_4$ ions, capable of slowing-down the treatment of a fresh lot of bones by precipitation of sulphate of lime can be eliminated over part or the whole of the filtrate in the form of a precipitate of $BaSO_4$, by the addition of the barium carbonate, according to the reaction:

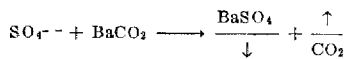

The precipitate is separated from the liquid phase, by filtration for example.

The new liquid phase containing regenerated $H_3PO_4$ and residual mono-calcium phosphate is percolated over ion exchange resins of the cationic type, regenerated in an $H^+$ cycle. All the calcium remaining, that is to say 12 to 15% of the initial calcium, is fixed on resin together with the other cations such as Na, K, Ba, Mg. . . . The effluent constitutes dilute $H_3PO_4$.

The cationic resin, saturated with alkali and alkaline earth cations, is regenerated in an $H^+$ cycle by treatment with an aqueous solution of a strong mineral acid such as hydrochloric acid.

After this operation, there is sent into the processing circuit the $H_3PO_4$ acid necessary for the treatment of a fresh charge of bones, while the additional acid, derived from the tri-calcium phosphate employed is utilized for the manufacture of a commercial alkali phosphate following a process known per se, such as by treatment with an alkali.

The present invention thus essentially covers the technique of regeneration of $H_3PO_4$ by the total elimination of the cations from the initial liquor. In the case of a method consisting in the treatment of bones by phosphoric acid, this elimination is then also effected on the recycling acid as well as on the fraction corresponding to the phosphorus of the bones.

The present invention also provides a further form of application permitting the purification of the phosphoric acid and its commercial exploitation in this form.

The phosphoric acid, freed from cations following the technique indicated above, is then de-coloured by treatment over active charcoal, percolated over anion-exchanger resins, regenerated in a $PO_4^{---}$, on which are fixed the anionic impurities such as $Cl^-$ and $SO_4^{--}$ as the case may be, and is then concentrated to 75%.

The acid obtained corresponds to the following analysis, and are compared with the known technical acid solutions.

TABLE II

| | Known technical solutions of phosphoric acid | | Acid prepared according to the invention |
|---|---|---|---|
| | DORR method by decantation | DORR method by filtration | |
| $H_3PO_4$, percent | 29.5 | 74 | 75 |
| $P_2O_5$, percent | 21.4 | 53.5 | 54.5 |
| F, percent | 2.0 | 0.8 | 0.025 |
| Cl, p.p.m | | | 80 |
| $SO_4$, percent | 0.8 | 2.6 | 0 |
| $As_2O_3$, p.p.m | 30 | 50 | 1 |
| $Al_2O_3$, percent | 0.7 | 1.0 | 0 |
| CaO, percent | 1.0 | 0.3 | ¹ 35 |
| MgO | | | 0 |
| Na, p.p.m | | | 40 |
| Heavy metals | | | Nil |

¹ P.p.m

The following examples are given by way of illustration and not in any limitative sense, of the application of this alternative method of the invention, reference being made in a particular case to the treatment of bones by phosphoric acid for the production of mono-calcium phosphate.

EXAMPLE 2

There are employed 10 litres of mono-calcium liquor obtained by phosphoric treatment of bones during the course of a previous operation, comprising:

| | G./l. |
|---|---|
| Phosphoric acid | 172 |
| $Ca^{++}$ (total) | 28.6 |

(1) There are added 682 grams of sulphuric acid at 65° Baumé, commercial quality at 92.4% $H_2SO_4$, while stirring slowly at ambient temperature (this quantity of acid corresponding to 90% of the total calcium).

The calcium, precipitated in the form of calcium sulphate (gypsum), is separated by filtration, dried and washed.

The filtrate collected comprises the regenerated phosphoric acid, the residual mono-calcium phosphate and calcium sulphate in solution, namely:

$Ca^{++}$, 4.95 g./l., of which residual Ca (mono-calcium) = 2.86, calcium of the $CaSO_4$ (in solution) = 2.09
$SO_4^{---}$, 4.85 g./l.
$CaSO_4$ in solution, 7.1 g./l.

(2) The $SO_4^{--}$ ions are eliminated from the above filtrate in the form of barium sulphate, by the addition of barium carbonate.

For example, 8 litres of the said filtrate are taken (comprising a total of 38.80 grams of $SO_4^{--}$) and there is added at ambient temperature and while stirring slowly: 83.9 grams of barium carbonate (commercial quality at 95% of $BaCO_3$); the stirring is continued until the $CO_2$ liberated is completely eliminated. The product is then filtered. The precipitate collected on the filter is dried. The filtrate has the following composition:

| | | |
|---|---|---|
| $H_3PO_4$ | g./l. | 165 |
| $Ca^{++}$ | g./l. | 4.7 |
| $SO_4^{--}$ | | Nil |

(3) The filtrate is then percolated on a cation-exchange resin of the sulphonated polystyrene type, such as for example that known commercially by the name of "IMAC C–12" regenerated in an $H^+$ cycle. The speed of passage is 4 to 5 volumes per hour. The $Ca^{++}$ is thus exchanged for the $H^+$ ions and the effluent, consisting of phosphoric acid diluted to about 150 grams per litre, is almost wholly free from $Ca^{++}$ ions (content of calcium less than 5 milligrams per litre).

The acid thus obtained by the conjoint action of a double decomposition and a fixation on an ion exchanger can then be re-cycled for a fresh treatment of bones, or it may be purified and converted for the purpose of its commercial exploitation.

EXAMPLE 3

By way of comparison, a further test was carried out under the same conditions, but adding a quantity of sulphuric acid corresponding theoretically to the whole of the calcium to be eliminated, thus, for 10 litres of the above mono-calcium liquor: 760 grams of 92.4% of sulphuric acid.

After the cake of gypsum has been dried, the volume of the filtrate is 8.566 ml.; this filtrate comprises:

$H_3PO_4$, 167 g./l.,
$Ca^{++}$, 3.31 g./l. (in the form of $CaSO_4$ in solution)
$SO_4$, 9.37 g./l.
$CaSO_4$, 11.3 g./l. (in solution).

This test brings out clearly the relatively-high solubility of the CaSO₄ in a dilute phosphoric medium, the impossibility of eliminating all the calcium by the double decomposition method, and the necessity of having recourse to another technique in order to achieve this object, in the present case, percolation over a cation exchanger.

EXAMPLE 4

The phosphoric acid diluted to about 150 grams per litre, completely freed from cations by the above process, can then be purified for the purpose of its conversion to commercially saleable phosphoric acid.

1000 ml. of phosphoric acid free from cations, of a light yellow colour due to impurities of an organic nature, are treated with potassium permanganate at the rate of 2.75 grams of KMnO₄ (in granular form) per 100 grams of phosphoric acid. The constituents of the mixture are left in contact for 3 hours at ambient temperature, while stirring slowly.

There is then added to the solution at the rate of 0.5 gram per litre, active charcoal in the powdered form having a high de-colouring power, for example that known commercially by the name of "Acticarbone 2S or 3S." This is left in contact for 30 minutes at 70° C.

The mixture is then filtered and a completely colourless filtrate is then obtained.

The dilute de-coloured phosphoric acid freed from cations can then be percolated over an anion-exchange resin which is slightly basic, for example the resin known commercially under the name of "Imac A 21-D" of the Imacti Company, saturated with PO₄⁻⁻⁻, which treatment has the object of eliminating the Cl⁻ ions contained by the phosphoric solution in a proportion of 0.336 gram per litre. After this treatment, the content of Cl⁻ is only 10 p.p.m.

The phosphoric acid thus obtained, de-coloured, purified by passing over ion exchangers, can then be concentrated to an acid containing 75% of $H_3PO_4$, the composition of which is that indicated in Table 2 above.

It will furthermore be understood that the present invention has only been descirbed purely by way of explanation and not in any limitative sense, and that any useful modification may be made thereto without thereby departing from its scope.

Without departing from its scope, the invention may also be applied to the extraction and the commercial exploitation of phosphoric acid from natural mineral phosphates and from de-phosphoration slags.

What is claimed is:

1. A method of converting tri-calcium phosphate to phosphoric acid of high purity comprising treating tri-calcium phosphate with phosphoric acid at a concentration of about 80–150 g./l. and at not greater than about 20° C. to provide monocalcium phosphate solution, subsequently passing the resulting solution over a strongly acidic cation exchange resin, and recovering therefrom purified phosphoric acid.

2. A method as claimed in claim 1, wherein the purified phosphoric acid recovered is re-cycled into said step of treating the tri-calcium phosphate.

3. A method as claimed in claim 1, wherein the purified phosphoric acid recovered is then reacted with an alkali, whereby a pure alkaline phosphate is obtained.

4. A method as claimed in claim 1, wherein the tri-calcium phosphate is contained in a charge of bones, the bone ossein remaining after the removal of the tri-calcium phosphate being converted to gelatine of improved quality.

5. A method of converting tri-calcium phosphate to phosphoric acid of high purity comprising treating a charge of bones with an aqueous solution of phosphoric acid at a concentration of about 80–150 g./l. and at not greater than about 20° C.; passing the resulting aqueous solution of mono-calcium phosphate over a strongly acidic cation-exchange resin regenerated in an H⁺ cycle; recovering the resulting pure phosphoric acid; and recycling a part of said pure phosphoric acid to the treatment of the charge of bones.

6. A continuous process comprising treating a charge of bones with an aqueous solution of phosphoric acid at a concentration of about 80–150 g./l. and at not greater than about 20° C.; passing the resulting aqueous solution of mono-calcium phosphate over a strongly acidic cation-exchange resin regenerated in an H⁺ cycle; recovering the resulting pure phosphoric acid; re-cycling a part of said pure phosphoric acid to the treatment of the charge of bones; and regenerating said resin by treatment with a strong mineral acid.

7. A process comprising the steps of: treating a charge containing tri-calcium phosphate with an aqeuous solution of phosphoric acid at a concentration of about 80–150 g./l. and at not greater than about 20° C. to obtain a solution of mono-calcium phosphate; passing a first portion of said resulting aqueous solution of mono-calcium phosphate over a first strongly acidic cation-exchange resin in the acid form to recover the quantity of phosphoric acid necessary for said treatment of tri-calcium phosphate; recycling said recovered phosphoric acid to said tri-calcium phosphate treatment; passing the second portion of said aqueous solution of mono-calcium phosphate over a second strongly acidic cation-exchange resin regenerated in a sodium cycle; and recovering from said second resin a solution of alkaline mono-sodium phosphate.

8. A process comprising the steps of: treating tri-calcium phosphate with phosphoric acid at a concentration of about 80–150 g./l. and at not greater than about 20° C.; treating the resulting aqueous solution of mono-calcium phosphate with sulphuric acid to precipitate the major portion of Ca⁺⁺ as CaSO₄; purifying the resultant solution by removing the calcium sulphate which has precipitated; and passing the resulting aqueous solution over a strongly acidic cation-exchange resin, whereby pure phosphoric acid is recovered.

9. A process as claimed in claim 8, in which the quantity of sulphuric acid amounts to 85 to 90% of the stoichiometric quantity necessary to precipitate all the calcium present.

10. A process comprising the steps of: treating an aqueous solution of mono-calcium phosphate with sulphuric acid; separating out the calcium sulphate precipitated; passing the resulting aqueous solution over a strongly acidic cation-exchange resin; and passing the resulting aqueous solution freed from cations over an anion-exchange resin, whereby pure phosphoric acid is obtained.

11. A process as claimed in claim 10, in which the quantity of sulphuric acid represents from 85 to 90% of the stoichiometric quantity necessary to precipitate all the calcium.

12. A process as claimed in claim 10, in which the SO₄⁻⁻ ions resulting from the treatment with sulphuric acid remaining in solution are precipitated by an agent which forms an insoluble sulphate preceding the treatment step employing ion-exchange resin.

References Cited

UNITED STATES PATENTS

| | | | |
|---|---|---|---|
| 2,899,292 | 8/1959 | Vickery | 23—109 X |
| 1,504,340 | 8/1924 | Glaeser | 23—107 |
| 3,055,735 | 9/1962 | Suzuki et al. | 23—107 |
| 3,192,013 | 6/1965 | Young | 23—165 |
| 2,567,227 | 9/1951 | Miller | 23—109 |
| 2,914,380 | 11/1959 | Vickery | 23—109 |

(Other references on following page)

FOREIGN PATENTS 760,524   10/1956   Great Britain.

OTHER REFERENCES

Kindt et al.: "Alkalimetric Determination of Phosphate After Separation of Calcium by Ion Exchange," Anal. Chem., vol. 27, July–December 1952, pp. 1501–1502.

Thilo et al.: Chem. Abstracts, vol. 55, p. 7774e.

OSCAR R. VERTIZ, *Primary Examiner.*

O. F. CRUTCHFIELD, A. GREIF,
*Assistant Examiners.*

UNITED STATES PATENT OFFICE
CERTIFICATE OF CORRECTION

Patent No. 3,374,055                      March 19, 1968

Ernest Michel Villalon

It is certified that error appears in the above identified patent and that said Letters Patent are hereby corrected as shown below:

In the heading to the printed specification, lines 8 and 9, "Claims priority, application France, Nov. 12, 1962, 915,417; June 4, 1963, 937,585" should read -- Claims priority, application France, Nov. 14, 1962, 915,417; June 10, 1963, 937,585 --.

Signed and sealed this 9th day of September 1969.

(SEAL)
Attest:

Edward M. Fletcher, Jr.                      WILLIAM E. SCHUYLER, JR.
Attesting Officer                            Commissioner of Patents